United States Patent
Maligne et al.

(10) Patent No.: US 7,063,001 B2
(45) Date of Patent: Jun. 20, 2006

(54) BRAKE SERVO-UNIT COMPRISING A FLOATING ELEMENT BEARING OFFSET VALVE SEATS

(75) Inventors: Jean-Charles Maligne, Aubervilliers (FR); Philippe Richard, Chelles (FR); Stéphane Lacroix, Tournan en Brie (FR); Ulysse Verbo, Aulnay-sous-Bois (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/513,629

(22) PCT Filed: Apr. 25, 2003

(86) PCT No.: PCT/EP03/04312

§ 371 (c)(1),
(2), (4) Date: Nov. 5, 2004

(87) PCT Pub. No.: WO03/095281

PCT Pub. Date: Nov. 20, 2003

(65) Prior Publication Data

US 2005/0211519 A1     Sep. 29, 2005

(30) Foreign Application Priority Data

May 7, 2002   (FR) .................... 02 05767

(51) Int. Cl.
*F15B 13/16*   (2006.01)
(52) U.S. Cl. .................... 91/369.2; 91/376 R
(58) Field of Classification Search .......... 91/376 R, 91/369.2, 369.3, 377; 60/582; 92/129, 140
See application file for complete search history.

(56) References Cited

U.S. PATENT DOCUMENTS

| | | | |
|---|---|---|---|
| 6,209,442 B1 * | 4/2001 | Haerr et al. | ............ 91/377 |
| 6,269,731 B1 | 8/2001 | Gautier et al. | |
| 6,467,390 B1 * | 10/2002 | Harth et al. | ............ 91/369.2 |
| 6,516,705 B1 * | 2/2003 | Vermoesen et al. | ........... 91/377 |
| 6,755,116 B1 * | 6/2004 | Tsubouchi et al. | ......... 91/369.2 |

FOREIGN PATENT DOCUMENTS

| | | |
|---|---|---|
| DE | 19741133 | 3/1999 |
| DE | 19835772 | 2/2002 |
| FR | 2687972 | 9/1993 |

* cited by examiner

*Primary Examiner*—Igor Kershteyn
(74) *Attorney, Agent, or Firm*—Leo H McCormick, Jr.; Sarah Taylor

(57) ABSTRACT

A pneumatic servomotor for power-assisted braking for a motor vehicle having a control rod (38) for opening and closing at least one axial inlet valve (52) that is interposed between a front chamber (16) connected to a pressure source having a pressure (Pa) greater than a first pressure (P1) and a back chamber (18) and at least one axial balancing valve (50) for actuating a moving partition (14) located between the front chamber (16) and the back chamber (18). The servomotor being characterized by one-piece floating tubular element (76) having axially offset transverse faces (78, 80) that have sealing elements (82,84) for sealing the axial inlet valve (52) and the balancing valve (50) with the control rod (38) being activated by a dish-shaped washer (49) carrying two springs (40,122) of different stiffnesses.

11 Claims, 12 Drawing Sheets

BRAKE SERVO-UNIT COMPRISING A FLOATING ELEMENT BEARING OFFSET VALVE SEATS

The invention relates to a pneumatic servomotor for power-assisted braking for a motor vehicle.

BACKGROUND OF THE INVENTION

The invention relates more particularly to a pneumatic servomotor for power-assisted braking for a motor vehicle, which servomotor is: of the type having a rigid casing inside which a moving transverse partition is mounted to define in leaktight manner a front chamber subjected to a first pressure, and a back chamber subjected to a second pressure varying between the first pressure and a pressure that is greater than the first pressure, which partition can drive an actuating rod for actuating a master cylinder associated with the servomotor via a reaction disk, and is returned resiliently by first return means; of the type having a control rod moving inside the piston selectively as a function of an axial inlet force exerted forwards against a return force applied to the rod by second return means; of the type in which the movements of the control rod can determine opening and closing of at least one axial valve referred to as an "inlet" valve and which is interposed between a pressure source subjected to the pressure greater than the first pressure and the back chamber, and at least one axial valve referred to as a "balancing" valve and which is interposed between the front chamber and the back chamber, for actuating the above-described moving partition; and of the type in which a plunger passing through the moving partition and secured to the end of the control rod can drive the actuating rod of the master cylinder directly, via the reaction disk.

Numerous examples of conventional servomotors of this type are known.

In such a servomotor, a piston is secured to the moving wall into which it is fitted, for example, and it receives the inlet and balancing valves. In addition, the balancing valve and the inlet valve are part of a single three-port valve in which a common seat is constituted by a shoulder front face of a moving element which is resiliently returned against a collar on the plunger and against a collar on the piston, from which collars it can be selectively separated to open the balancing valve or the inlet valve.

Thus, a substantially radial duct that passes through the piston and that opens out into the front chamber, and a substantially axial duct which opens out to the outside of the servomotor are selectively put into communication via a respective one of valves with a radial duct that passes through the piston and that opens out in the back chamber to maintain or to reduce to zero a pressure difference between the back and the front chambers, and to cause the moving partition to move.

Such a design suffers from the drawback of requiring ducts to be formed in the piston with complex shapes, which disturbs the flow of air. As a result, a servomotor generally has response times that are relatively high, and is noisy.

In addition, such a design is particularly costly to implement because it requires a piston to be used whose internal shapes, serving to form the ducts, can be formed only by performing a machining method.

SUMMARY OF THE INVENTION

The invention proposes a design making it possible to remedy those drawbacks, and in which the ducts are axial and are part of different tubular elements of the servomotor. This design makes it possible to facilitate air flow through the valves, thereby making it possible to reduce the response times of the servomotor, while also guaranteeing that it operates quietly. In addition, this novel design makes it possible to make most of the elements of the servomotor by implementing a stamping method, which is less costly than conventional machining or molding methods.

To this end, the invention provides a servomotor of the above-described type; characterized in that it includes:

a one-piece floating tubular element interposed substantially radially between the plunger and the piston, which element is mounted to move axially, is returned resiliently towards the moving partition by third return means, and has axially offset transverse faces that are provided with first sealing elements for sealing the axial inlet and balancing valves;

a complementary transverse second sealing element for sealing the inlet axial valve, which element is carried by the back end of the plunger; and a complementary transverse second sealing element for sealing the balancing axial valve, which element is provided on at least a portion of the back face of the moving partition;

and in that the back end of the plunger is provided with a dish-shaped washer which includes the complementary transverse second sealing element for sealing the inlet axial valve, and which receives in abutment the ends of two coaxial springs, namely a first spring of high stiffness whose other end is in abutment against the moving partition, and which forms the second return means associated with the control rod, and a second spring of low stiffness whose other end is in abutment against a shoulder face of the tubular element, and which forms the third return means associated with said tubular element and which enables said tubular element to be urged to close the balancing valve.

According to other characteristics of the invention:

the floating tubular element comprises:

a front tubular segment which is mounted in leaktight manner around a tubular bearing on the moving partition, which bearing slidably receives the plunger whose front end that carries the first sealing element of the balancing valve facing the second sealing element of the balancing valve that is carried by the moving partition is disposed radially outside at least one communication hole passing through the partition;

an intermediate tubular segment which communicates with the back chamber; and a back tubular segment which is of diameter smaller than the diameter of the intermediate segment, which is slidably guided in leaktight manner in a back tubular segment of the casing that forms an inlet duct fed by the pressure source subjected to the pressure greater than the first pressure, and whose front transverse face connecting to the intermediate segment carries the second sealing element of the inlet valve facing the dish-shaped washer of the plunger.

the first sealing element of the balancing valve is constituted by a gasket which is received in the front segment of the floating tubular element;

the second sealing element of the balancing valve is constituted by a portion of the back face of the moving partition;

the first sealing element of the inlet valve is constituted by a front transverse face of a wall interconnecting the intermediate segment and the back segment of the floating tubular element; and the second sealing element of the inlet valve is constituted by a gasket which is carried by a back face of the dish-shaped washer that is secured to the plunger;

the tubular bearing for guiding the plunger, which bearing is carried by the moving partition, extends axially from the back face of the moving partition, and the moving partition is provided with a plurality of holes distributed angularly through the transverse partition around the junction where its tubular bearing meets its back face;

the first spring is disposed inside the second spring, and the two springs are mounted inside the tubular element;

the first spring is interposed between a front face of the dish-shaped washer and a shoulder face of the front tubular bearing, and in that the second spring is interposed between the front face of the dish-shaped washer and front end transverse faces of opposite longitudinal slots in the intermediate segment of the tubular element, which slots make it possible for communication to be established with the back chamber;

the first spring is disposed outside the second spring, and the two springs are mounted outside the tubular element via an annular holding ring having at least two diametrically opposite radial arms passing through associated slots in the tubular element to come to bear on the dish-shaped washer;

the first spring is interposed between a shoulder face of the annular ring and a bearing cup which surrounds the tubular element and which is secured to the moving partition, and the second spring is interposed between an end face of the tubular annular ring and a shoulder transverse face of the tubular element that defines the front segment and the intermediate segment thereof;

the back segment of the tubular element is mounted in leaktight manner in the back segment of the casing via a lip gasket;

the plunger is mounted to slide in the tubular bearing of the moving partition via a slidably mounted tubular element having a front collar which is disposed facing the reaction disk and which can be driven by a collar on the plunger for a force of determined magnitude to transmit the reaction force from the actuating rod of the master cylinder in part to the control rod of the servomotor and in part to the moving partition; and the moving partition, the floating tubular element, and the dish-shaped washer secured to the plunger are made by implementing cutting and stamping methods.

Other characteristics and advantages of the invention appear on reading the following detailed description which is made easier to understand by referring to the accompanying drawings.

DETAILED DESCRIPTION OF THE INVENTION

In the following description, like references designate parts that are identical or that have similar functions.

By convention, the terms "front", "back", "top", and "bottom" respectively designate elements or positions disposed respectively towards the left, the right, the top, and the bottom of FIGS. 1 to 7b.

Figure 1:
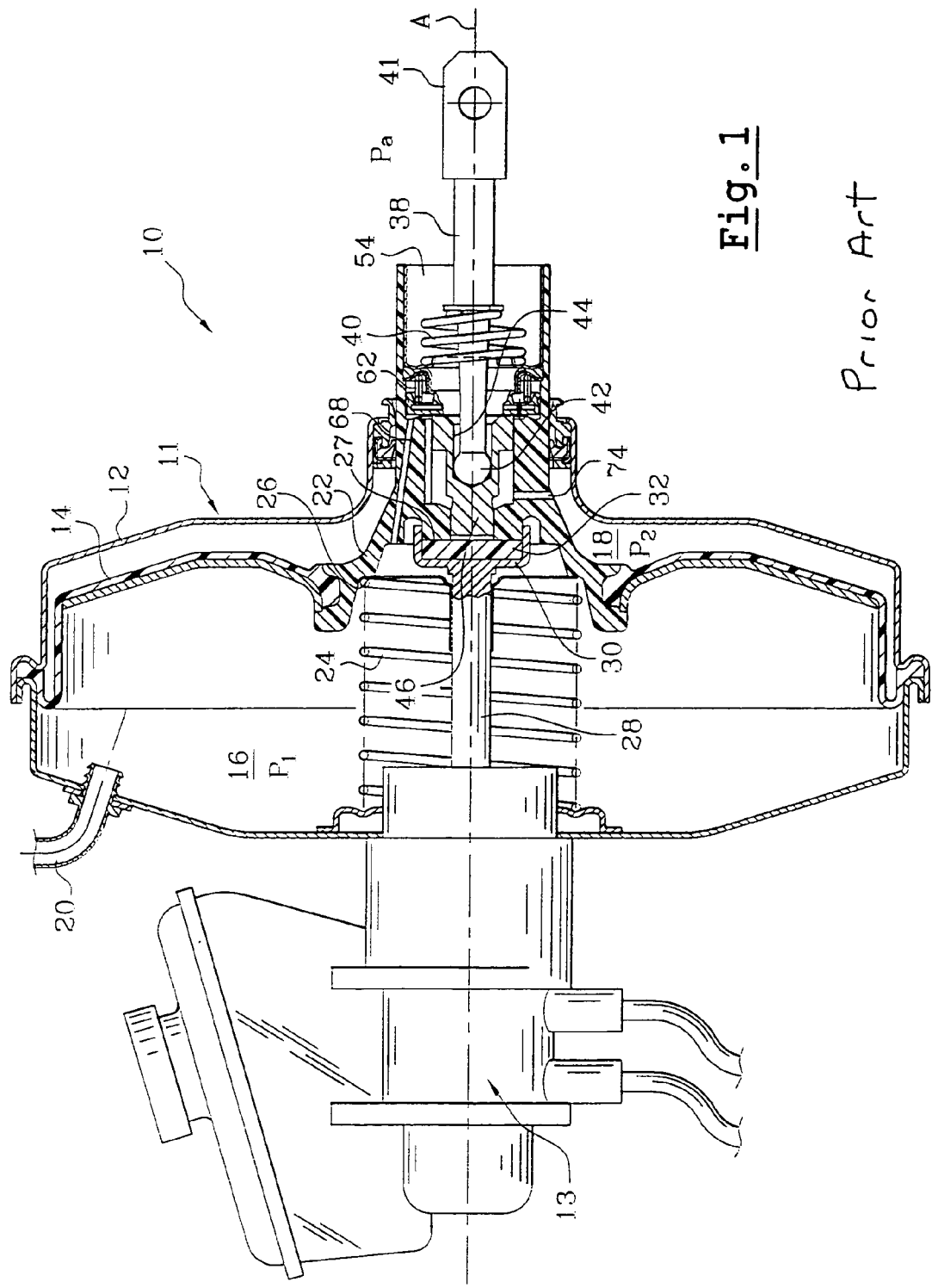
FIG. 1 is an overall axial section view of a servobrake having a prior art pneumatic servomotor for power-assisted braking.

FIG. 1 shows a servobrake 10 including a conventional pneumatic servomotor 11 for power-assisted braking for a motor vehicle. The servomotor 11 serves to actuate a master cylinder 13 for braking the vehicle.

In known manner, the pneumatic servomotor 10 has a rigid casing 12 inside which a transverse partition 14 is mounted that defines in leaktight manner a front chamber 16 subjected to a first pressure "$P_1$", and a back chamber 18 subjected to a second pressure "$P_2$". The second pressure "$P_2$" can vary between the value of the pressure "$P_1$" and the value of a pressure "$P_a$" that is greater than the pressure "$P_1$" so as to cause the partition 14 to move, which partition can, as explained below, drive an actuating rod 28 for actuating the master cylinder 13.

More particularly, the pressure "$P_1$" corresponds in particular to a pressure delivered by a suction source of the vehicle. When the engine is a spark-ignition engine, the suction pressure "$P_1$" is, for example, delivered by an intake manifold of the engine of the vehicle, and when the engine is a compression-ignition engine of the "diesel" type, the suction pressure "$P_1$" is, for example, delivered by a vacuum pump of the vehicle.

The front chamber 16 is connected to the suction source of the vehicle via a suction duct 20 which opens out into the casing 12.

The pneumatic servomotor 11 includes a moving piston 22 having an axis A and that is secured to the moving partition 14. For example, the moving piston 22 is fitted through the moving partition 14.

Inside the casing 12, the moving partition 14 is returned resiliently by first return means constituted by a return spring 24 which abuts against the casing 12 and against a front face 26 of the moving piston 22. The front face 26 of the moving piston 22 has a front cylindrical bearing 27 which is organized to face a reaction disk 32 which is received in a dish-shaped washer 30 that is secured to or integral with the actuating rod 28 for actuating the master cylinder 13.

A control rod 38 which is, for example, connected to a brake pedal of the vehicle via a coupling sleeve 41, can move inside a casing 12, and more particularly inside the moving piston 22, selectively as a function of an axial inlet force exerted forwards on the sleeve 41. The actuating force is exerted against a return force applied to the rod 38 by second return means, in particular a return spring 40 which is interposed between the moving piston 22 and the control rod 38.

The front end of the control rod 38, which end is opposite from the sleeve 41, is shaped in the form of a ball 42 and it is received in a complementary socket 44 in a plunger 46 that is substantially cylindrical and that is mounted to slide inside the moving piston 22.

Figure 2:
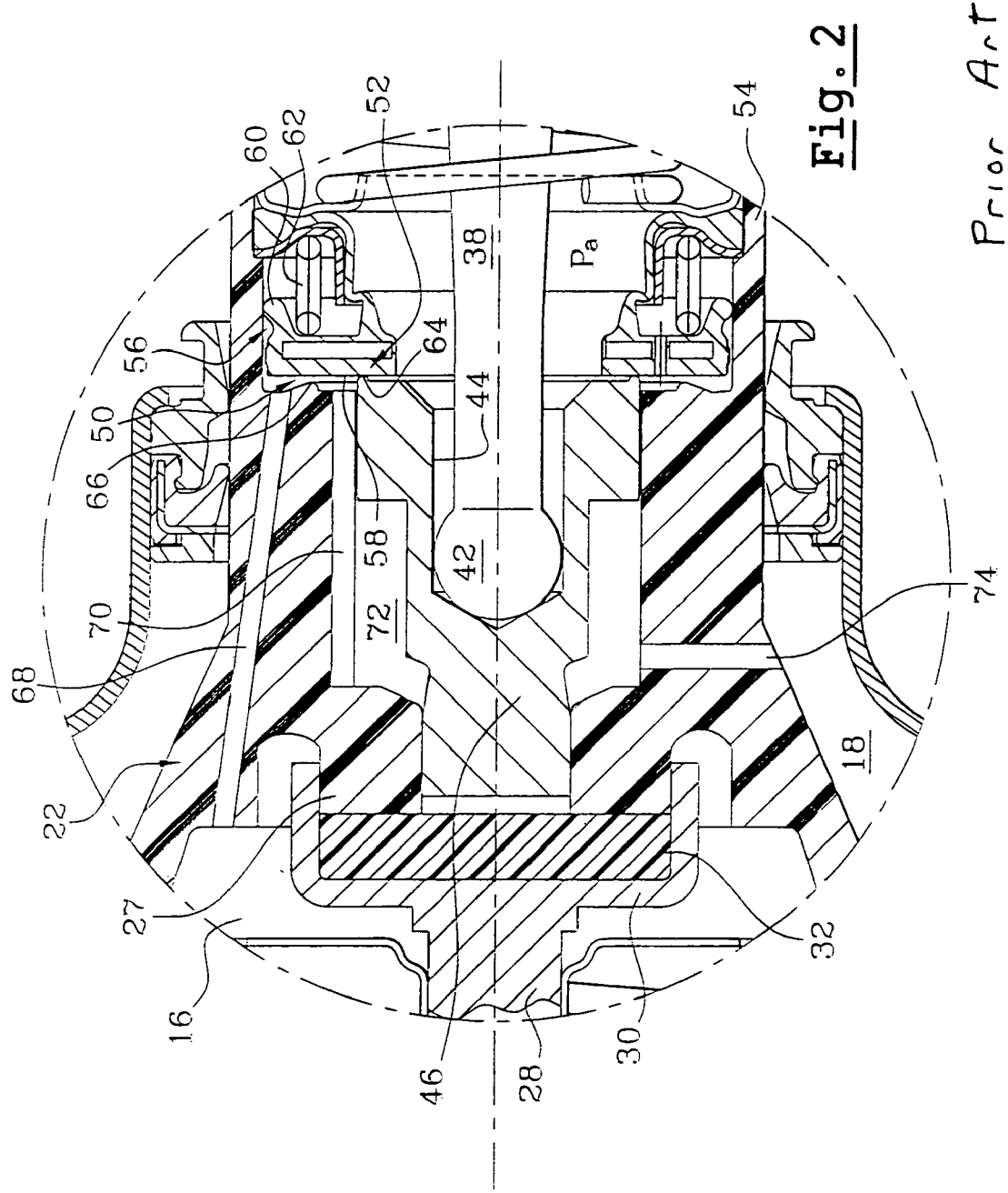
FIG. 2 is a detail view of the servomotor of FIG. 1.
Figure 3A:
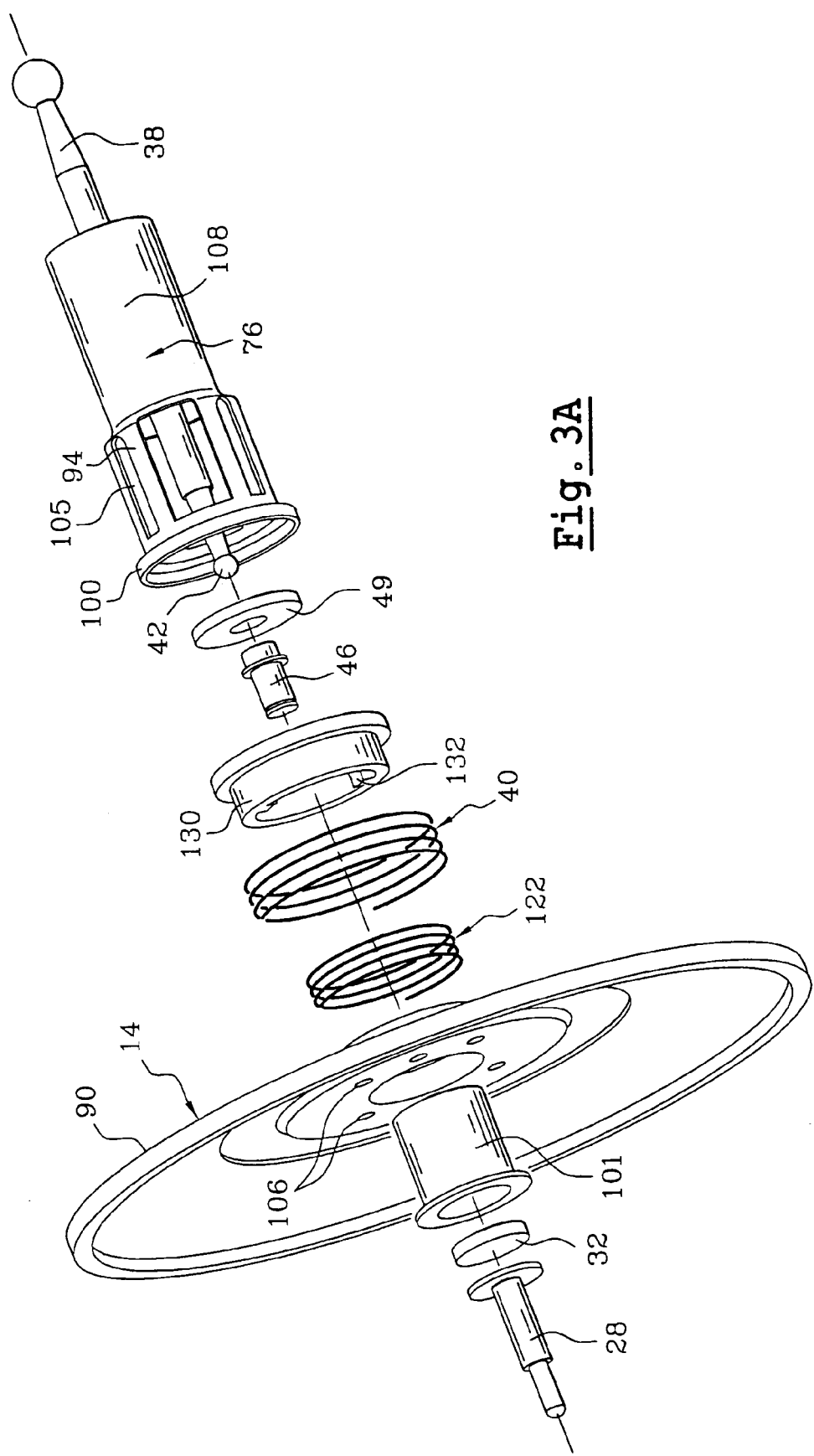
FIG. 3a is a perspective view of the elements inside the casing of a first embodiment of a servomotor of the invention.
Figure 3B:
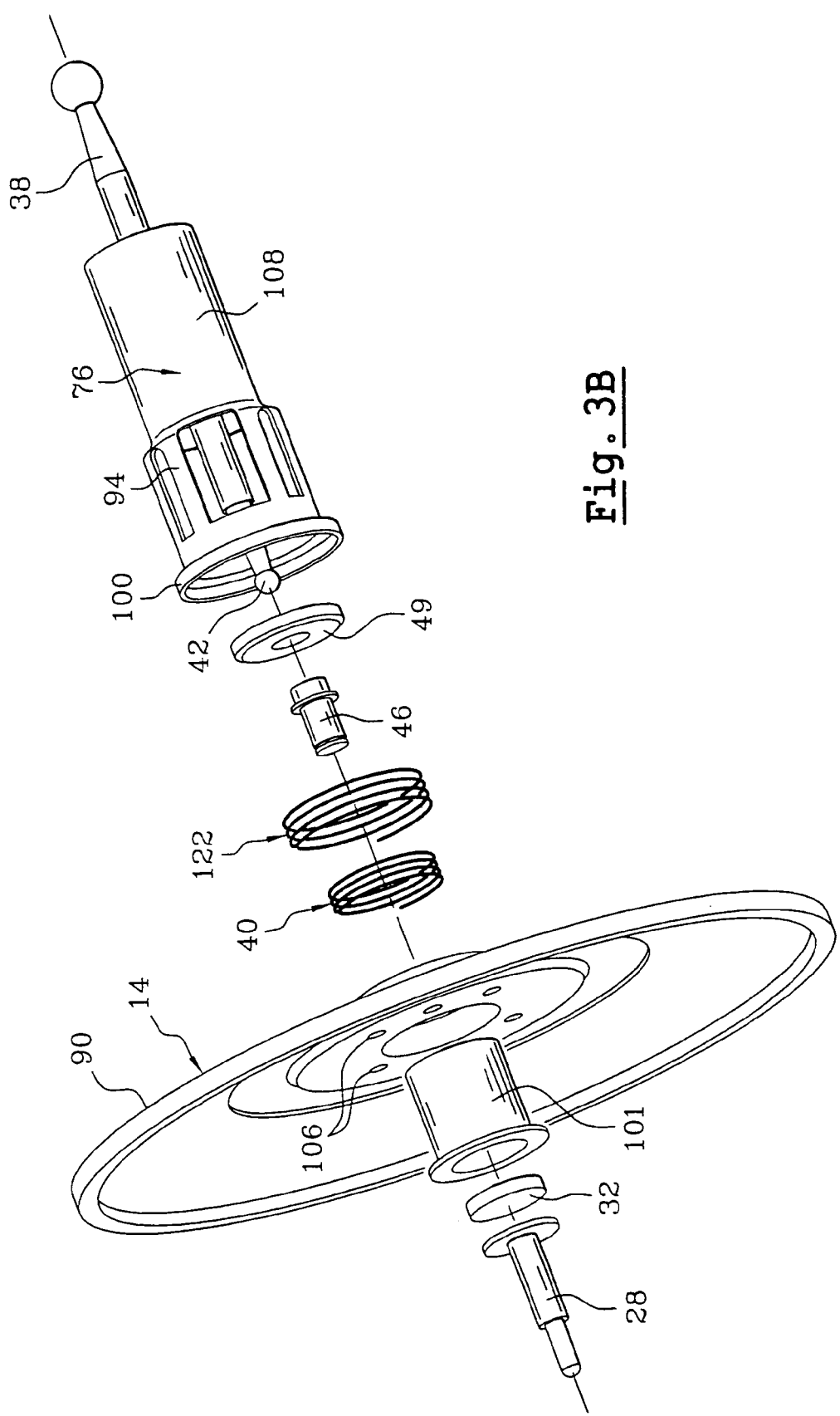
FIG. 3b is a perspective view of the elements inside the casing of a second embodiment of a servomotor of the invention.

As shown more particularly in FIG. 2, the movements of the control rod 38 can determine opening and closing of at least one axial valve 52 referred to as an "inlet" valve and which is interposed between a pressure source subjected to the pressure "$P_a$" greater than the first pressure "$P_1$" and the back chamber 18, and at least one axial valve 50 referred to as a "balancing" valve and which is interposed between the front chamber 16 and the back chamber 18, for actuating the above-described moving partition.

In known manner, and in a manner not limiting the invention, the pressure source subjected to the pressure "$P_a$" corresponds to the ambient atmospheric pressure. To this end, the valve 52 opens out directly into a back end 54 of the body of the piston 22 forming an axial duct which is open to the ambient air.

In conventional manner, the balancing valve 50 and the inlet valve 52 are part of a single valve 56 having three ports and a common seat 58 constituted by a shoulder front face of a moving annular element 60 which is urged resiliently by a return spring 62 against a collar 64 of the plunger 46 and against a collar 66 of the piston 22.

Thus, a substantially radial duct 68 which passes through the piston 22 and which opens out into the front chamber 16, or else the substantially axial duct 54 which opens out to the outside of the servomotor 11, can, via a guide bore 72 for guiding the plunger and via a groove 70 formed in said bore, be put selectively into communication with a radial duct 74 that passes through the piston 22 and that opens out into the back chamber 18 for the purpose of maintaining or reducing to zero a pressure difference between the front chamber 16 and the back chamber 18, and thereby causing the moving partition 14 to move.

The inlet valve 52 and the balancing valve 50 are resiliently urged into a position in which the inlet valve 52 is closed and the balancing valve 50 is open by the second return means constituted by the spring 40 for returning the control member 38.

Such a design is particularly costly to implement because it requires a piston to be used whose inside shapes, which serve to form the ducts 68 and 74, can be formed only by a machining method.

In order to remedy that drawback, the invention proposes a servomotor 11 of the above-described type in which the inlet duct and the balancing duct are formed in tubular elements of the servomotor 11.

To this end, as shown in FIG. 3 et seq., the servomotor 11 does not have a piston, and it includes:

a one-piece floating tubular element 76 interposed substantially radially between the plunger 46 and the casing 12, which element is mounted to move axially and is returned resiliently towards the moving partition 14 by third return means whose axially offset transverse faces 78, 80 are provided with first sealing elements 82, 84 for sealing the axial inlet and balancing valves 50, 52;

a complementary transverse second sealing element 86 for sealing the inlet axial valve 52, which element is carried by the back end 45 of the plunger 46; and a complementary transverse second sealing element 88 for sealing the balancing axial valve 50, which element is provided on at least a portion of the back face 90 of the moving partition 14.

In addition, the back end 45 of the plunger 46 is provided with a dish-shaped washer 49 which includes the complementary transverse second sealing element 86 for sealing the inlet axial valve 52, and which receives in abutment the ends 41, 123 of two concentric springs 40, 122, namely a first spring 40 of high stiffness whose other end 39 is in abutment against the moving partition 14, and which forms the second return means associated with the control rod 38, and a second spring 122 of low stiffness whose other end 121 is in abutment against a shoulder face of the tubular element 76, and which forms the third return means associated with said tubular element 76 and which enables said tubular element to be urged to close the balancing valve 50.

As explained below, the springs 40 and 122 can take up either of two particular configurations, each of which is associated with a particular embodiment of the invention.

In both embodiments of the invention, the floating tubular element 76 has a tubular front segment 100 which is mounted in leaktight manner around a tubular bearing 98 of the moving partition 14 that slidably receives the plunger 46. The front end 102 of the tubular front segment 100 carries the first sealing element 84 for sealing the balancing valve 50 facing the second sealing element 88 for sealing the balancing valve 50 that is carried by the moving partition 14. The front end 102 of the front segment 100 is disposed-radially outside at least one communication hole 106 passing through the partition 14.

In the invention, the floating tubular element 76 also has an intermediate tubular segment 94 which communicates with the back chamber 18 via slots 105.

Finally, the floating tubular element 76 has a back tubular segment 108, of diameter smaller than the diameter of the intermediate segment 94, which is slidably guided in leaktight manner in a back tubular segment 109 of the casing 12.

In particular, the back tubular segment 108 is mounted to slide through a lip gasket 113 carried by the back tubular segment 109 of the casing 12.

Advantageously, the back tubular segment 108 forms an inlet duct fed by the pressure source subjected to the pressure "$P_a$" greater than the first pressure "$P_1$".

Advantageously, a front transverse face 78 connecting to the intermediate segment 94 carries the second sealing element 82 of the inlet valve 52 facing the dish-shaped washer 49 of the plunger 46.

More particularly, the first sealing element 82 of the inlet valve 52 is constituted merely by the transverse face 108 interconnecting the intermediate segment 94 and the back segment 108 of the floating tubular element 76, and the second sealing element 86 of the inlet valve 52 is constituted by a gasket which is carried by a back face 87 of the dish-shaped washer 49 secured to the plunger 46. Preferably, the gasket 87 is fitted into and/or bonded with adhesive into a groove provided in the back face 87 of the plunger 49.

In addition, the first sealing element 84 of the balancing valve 50 is constituted by a gasket which is fitted into and/or bonded with adhesive into a bore 103 in the end 102 of the front segment 100 of the floating tubular element 76, and the second sealing element 88 of the balancing valve 50 is constituted by a portion of the back face 90 of the moving partition 14.

The invention is not limited to these provisions, and the gaskets can be carried respectively by the transverse face 78 interconnecting the intermediate segment 94 and the back segment 108, and by the back face 90 of the moving partition 14.

The tubular bearing 98 for guiding the plunger 46, which bearing is carried by the moving partition 14, extends axially from the back face 90 of the moving partition 14 with which it is preferably integrally formed.

More particularly, the plunger 46 is mounted to slide in the tubular bearing 98 of the moving partition 14 via a tubular element 101 which is mounted to slide in a bore 99 in the tubular bearing 98, and which has a front collar 107 disposed facing the reaction disk 32. The tubular element 101 can be urged by a collar 109 of the plunger 46 when subjected to a force of determined magnitude so as to transmit the reaction force from the rod for actuating the master cylinder in part to the rod 38 for controlling the servomotor, and in part to the moving partition 14.

Since such a tubular element 101 is widely known from the state of the art, it is not described any more explicitly in the description below.

In this configuration, the front segment 100 slides in leaktight manner on said tubular bearing 98 via a lip 85 of the gasket 84. In order to enable the balancing valve 50 to interrupt or to allow the communication between the front chamber 16 and the back chamber 18, the moving partition 14 is provided with plurality of holes 106 distributed angularly through the transverse partition 14 around the junction where its tubular bearing 98 meets its back face 90. In addition, this configuration makes it possible to guarantee that air flows as well as possible through the moving partition 14 when the balancing valve 50 is open.

In a first embodiment of the invention shown in FIGS. 3a to 7a, the first spring 40, which is of high stiffness, is disposed outside the second spring 122, which is of low stiffness. In addition, both of the springs 40 and 122 are mounted outside the tubular element 76 in abutment against the dish-shaped washer 49 via an annular holding ring 130 having at least two radial arms 132 diametrically opposite each other passing through associated slots in the tubular element 76 for bearing against the dish-shaped washer 49.

In particular, the annular ring 130 is provided with two diametrically opposite arms 132 which pass through the slots 105 in the intermediate segment 94 of the floating tubular element 76.

More particularly, the first spring 40 is interposed between a shoulder face 134 of the annular ring 130 and a bearing cup 136 which surrounds the front segment 100 of the tubular element 76 and which is in reaction against the moving partition 74, and the second spring 122 is interposed between an end face 138 of the tubular annular ring and a shoulder back transverse face 140 of the tubular element 76, which face is disposed behind the wall defining the front segment 100 and the intermediate segment 94 thereof.

In a first embodiment of the invention, which is shown in FIGS. 3b to 7b, the first spring 40 is disposed inside the second spring 122, and the two springs 40, 122 are mounted inside the tubular element 76.

More particularly, the first spring is interposed between a front face 142 of the dish-shaped washer 49 and a shoulder face 144 of the front tubular bearing 98, and the second spring 122 is interposed between the front face 142 of the dish-shaped washer 49 and front end transverse faces 146 of the opposite longitudinal slots 105 in the intermediate segment 94 of the tubular element 76, which slots make it possible for communication to be established with the back chamber 18.

A particular advantage of both embodiments of the invention is that the moving partition 14, the floating tubular element 76, and the dish-shaped washer 49 secured to the plunger 46 are preferably made by implementing cutting and stamping methods. In the first embodiment of the invention, the ring 130 is also preferably made by implementing cutting and stamping methods. This configuration is particularly advantageous because it enables the servomotor 11 to be made with extremely low manufacturing costs.

In addition, in both of the embodiments of the invention, the moving partition 14 and the tubular element 76 have simple tubular shapes, air flow is facilitated through valves 50 and 52, which makes it possible to reduce the response time of the servomotor 11 while also guaranteeing that it operates quietly.

In this configuration, the internal elements of the servomotor 11 can take up four different configurations which are shown respectively in FIGS. 4a to 7a, and 4b to 7b.

Figure 4A:
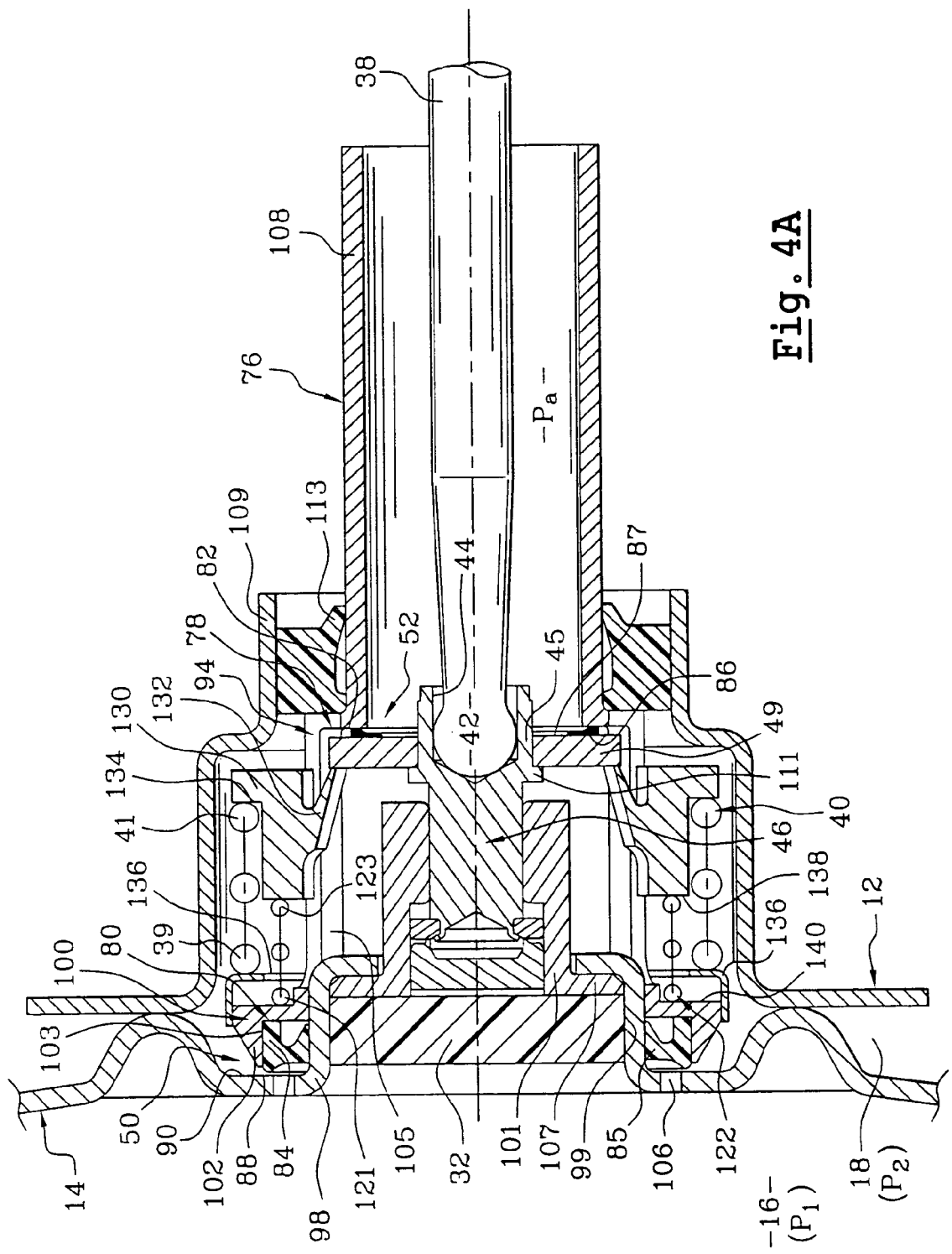
FIGS. 4a and 4b are detail views in axial section through servomotors associated respectively with the first and with the second embodiments of the invention, the plunger being at rest, the balancing valve being open, and the inlet valve being closed.
Figure 4B:
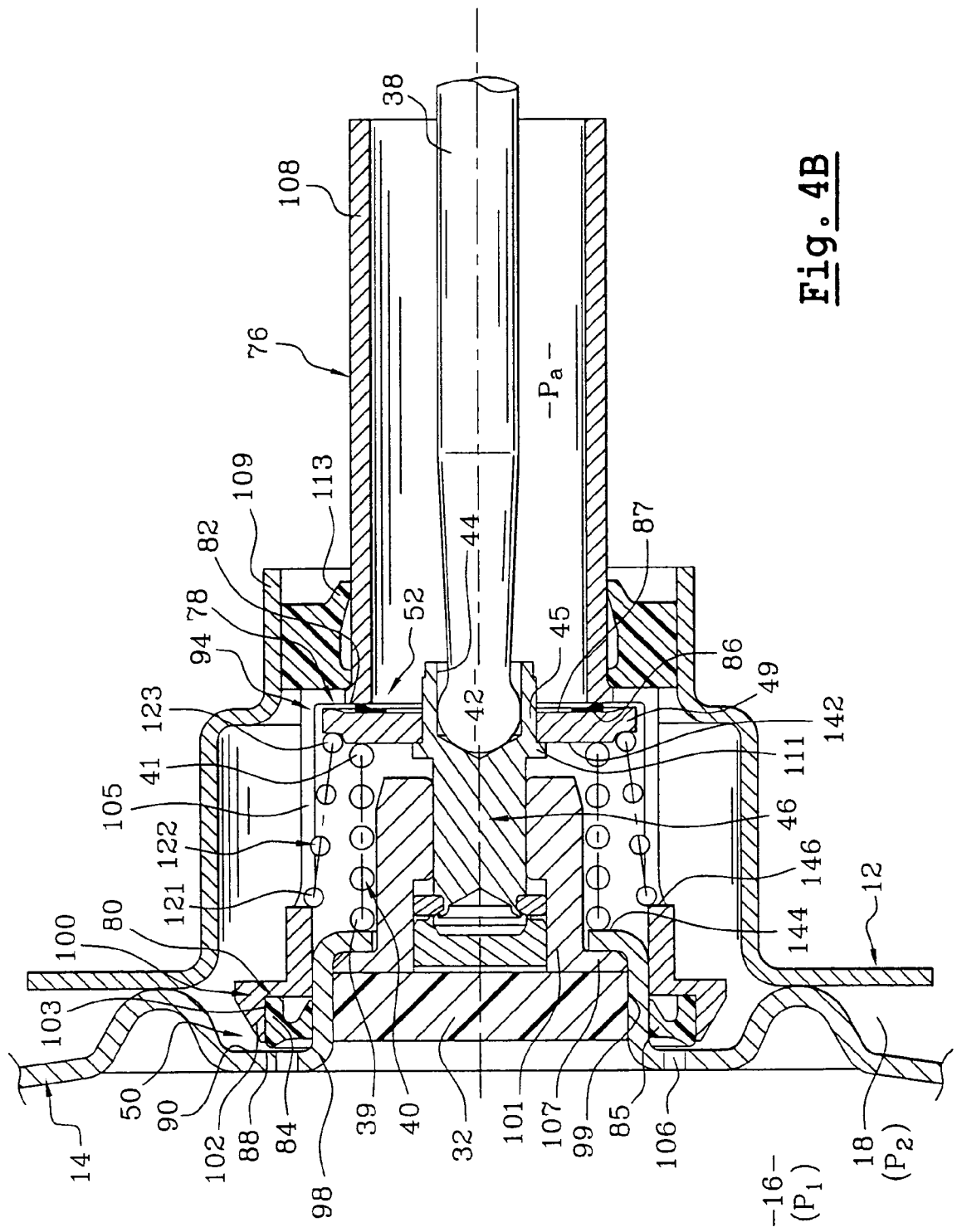

As shown in FIGS. 4a and 4b, the control rod 38 can take up a rest position. In this position, the air inlet valve 52 is closed and the balancing valve 50 is open, so that the front chamber 16 and the back chamber 18 are subjected to the same suction pressure "$P_1$". The partition 14 is thus stationary. The control rod 38 and the plunger 46 are held in their rest position by the spring 40 which exerts a return force on the dish-shaped washer 49.

Figure 5A:
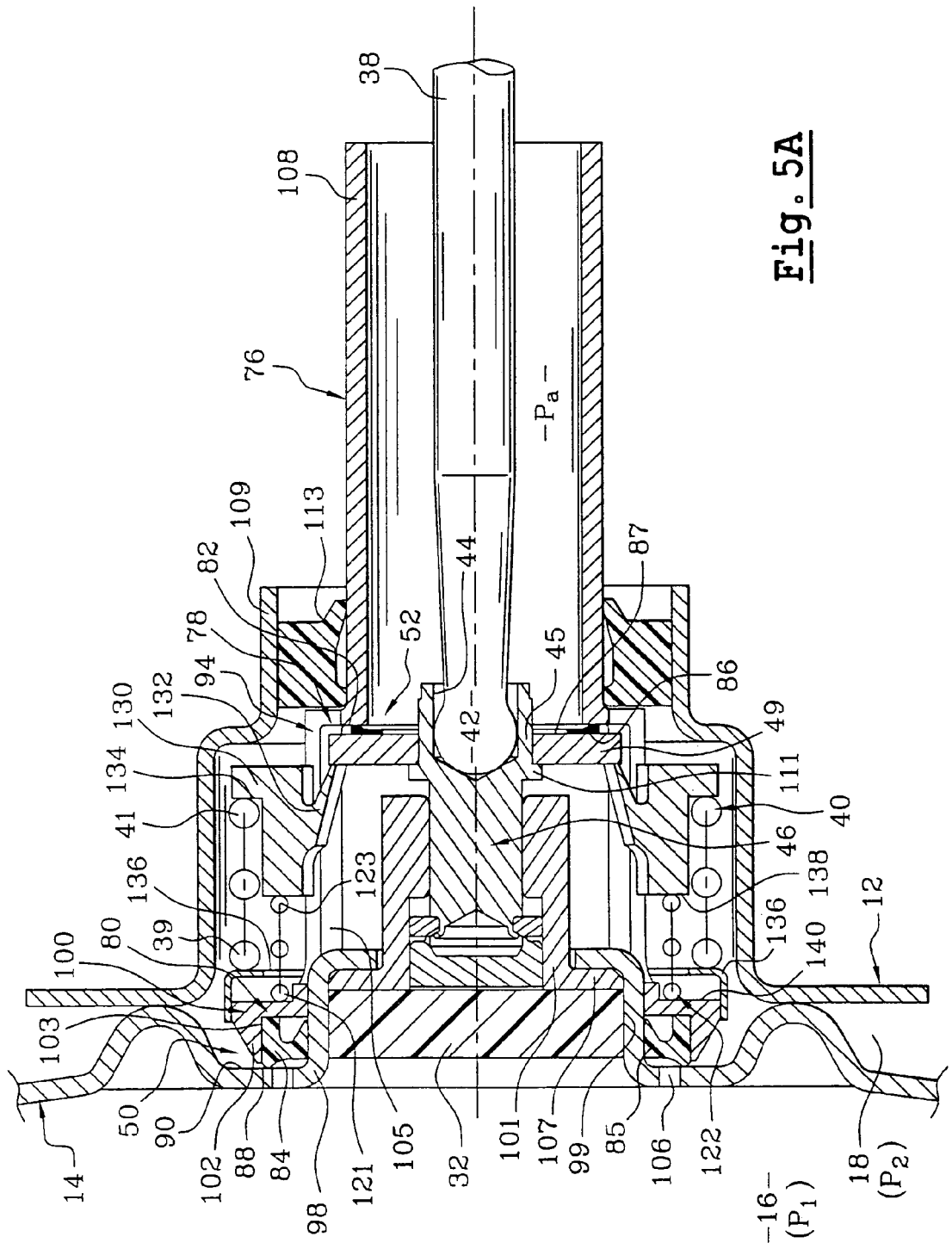
FIGS. 5a and 5b are detail views in section through servomotors associated respectively with the first and with the second embodiments of the invention, the plunger being actuated and the balancing valve and the inlet valve being closed.
Figure 5B:
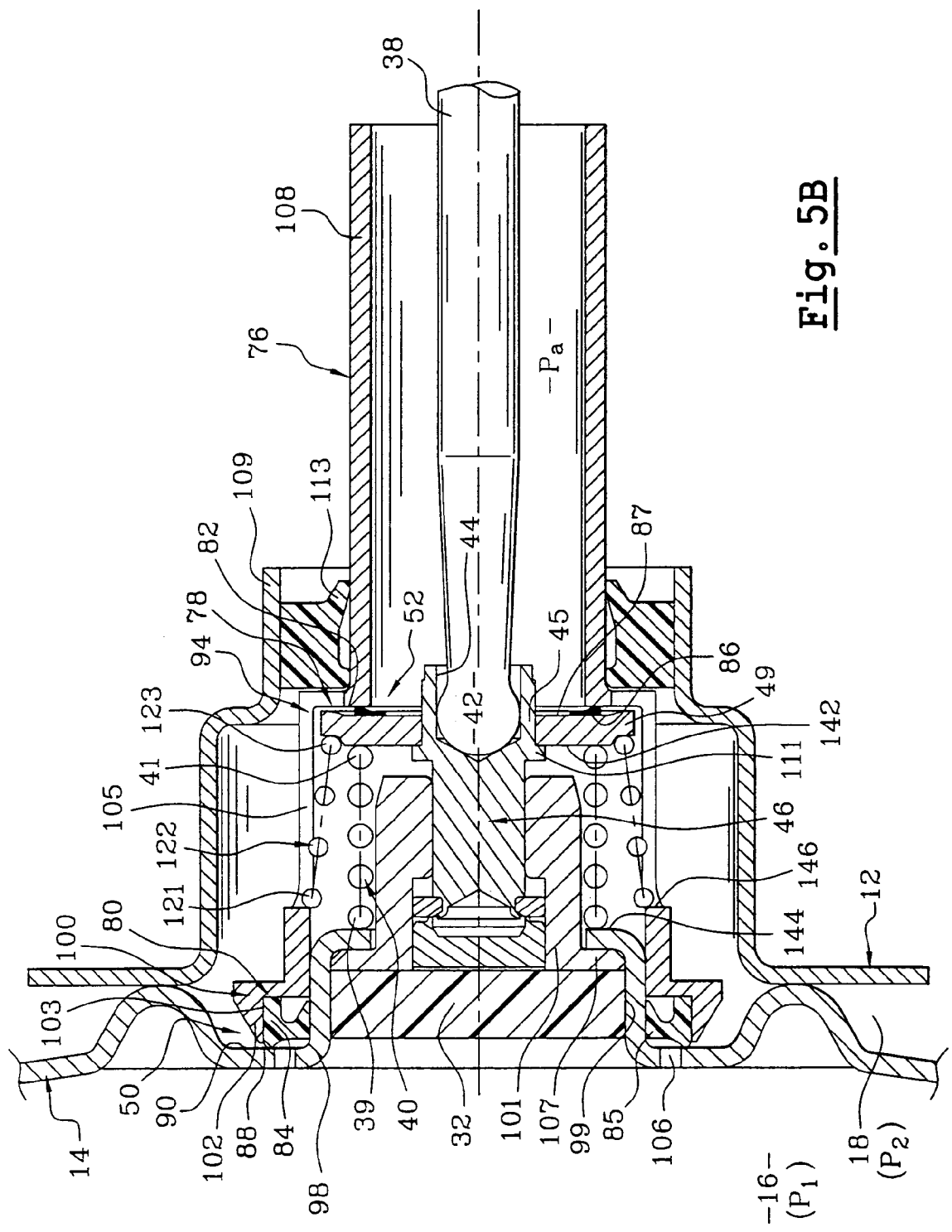

Starting from this position, moving the control rod 38 forwards causes the plunger 46 and the dish-shaped washer 49 that is connected to it to move forwards by compressing the spring 40, as shown in FIGS. 5a and 5b.

In the first embodiment, the dish-shaped washer 49 pushes the tubular ring 130 for holding the first and second springs 40, 122. Since the first spring 40 is of high stiffness, it compresses while the tubular bushing 130 drives the tubular element 76 via the spring 122 of low stiffness until the gasket 84 comes into contact with the portion of the back face 90 of the partition 14, thereby causing the balancing valve 50 to close as shown in FIG. 5a.

In the second embodiment, since the second spring 40 is of high stiffness, it compresses while the dish-shaped washer 49 drives the tubular element 76 via the spring 122 of low stiffness until the gasket 84 comes into contact with the portion of the back face 90 of the partition 14, thereby causing the balancing valve 50 to close, as shown in FIG. 5b.

Figure 6A:
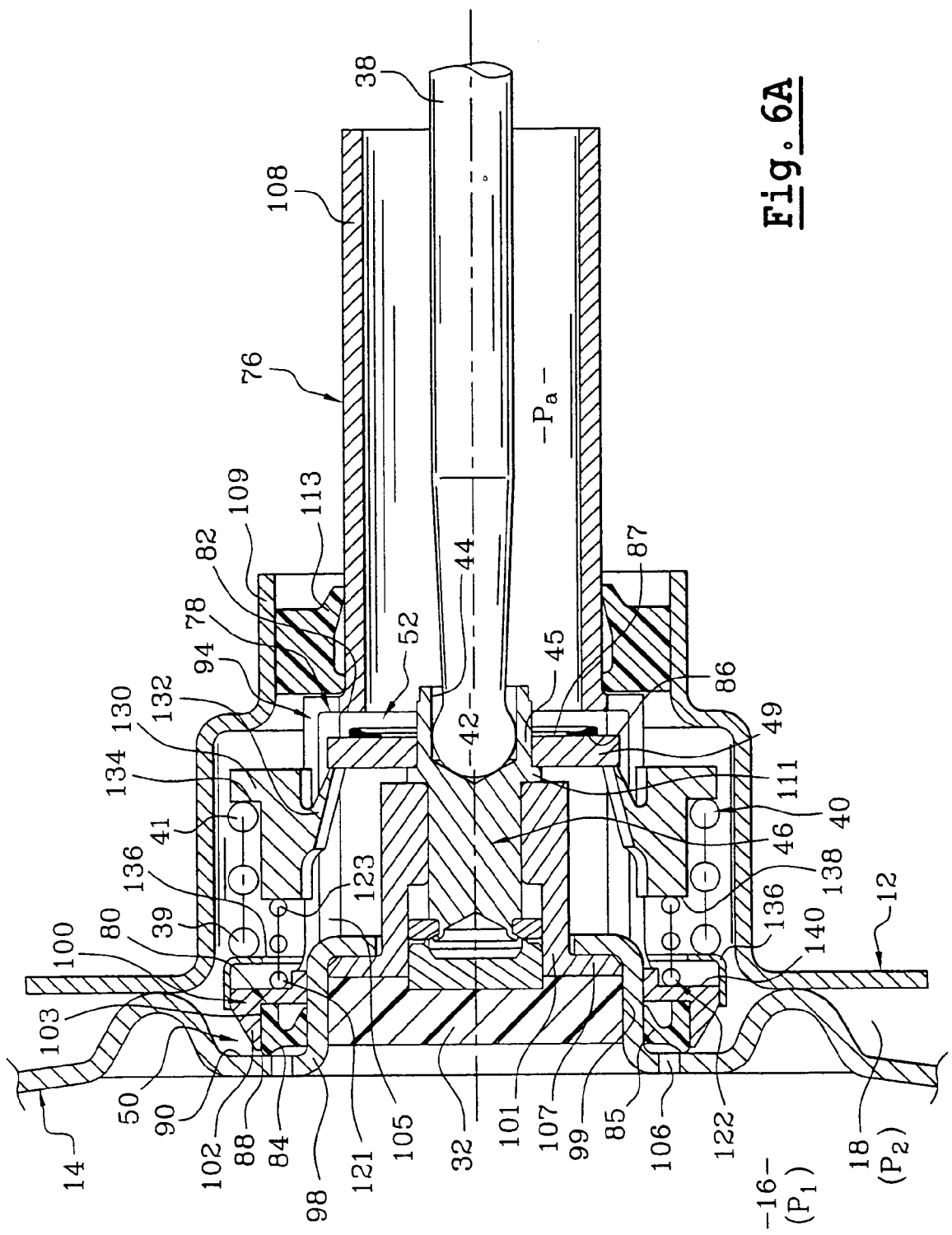
FIGS. 6a and 6b are detail views in section through servomotors associated respectively with the first and with the second embodiments of the invention, the plunger being actuated, the balancing valve being closed, and the inlet valve being open.

In the first embodiment, by continuing to advance, the control rod 38, actuating the plunger 46, then compresses the spring 122 via the ring 130, which causes the dish-shaped washer 49 and the associated gasket 86 to lift off the transverse face 78 interconnecting the intermediate segment 94 and the back segment 108 of the element 76 forming the first sealing element 82 of the inlet valve 52, as shown in FIG. 6a.

Figure 6B:
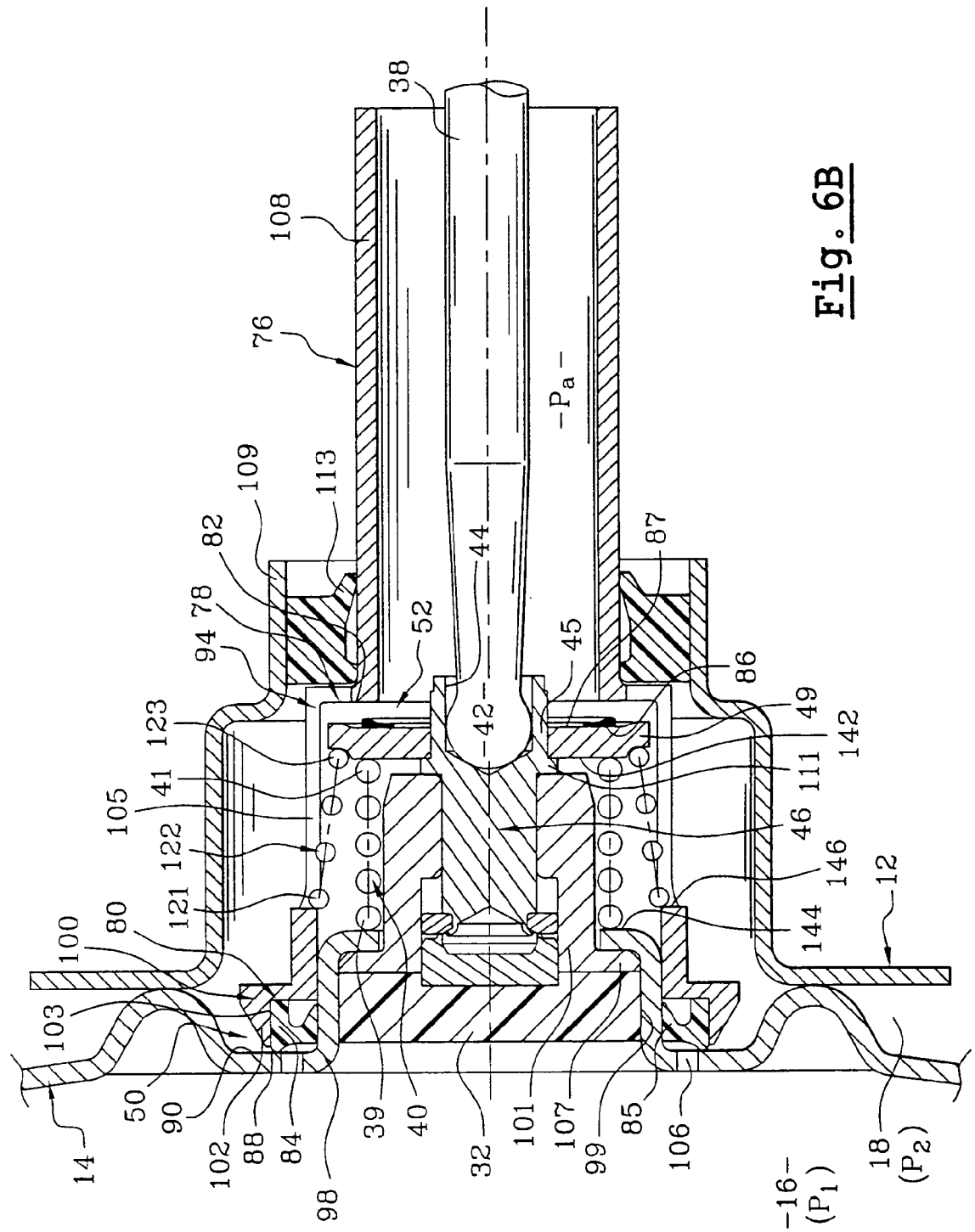

In the second embodiment, by continuing to advance, the control rod 38, actuating the plunger 46, directly compresses the spring 122, which causes the dish-shaped washer 49 and the associated gasket 86 to lift off from the transverse face 78 interconnecting the intermediate segment 94 and the back segment 108 of the element 76 forming the first sealing element 82 of the inlet valve 52, as shown in FIG. 6b.

In both embodiments, air at atmospheric pressure then penetrates into the back chamber 18 and pushes away the moving partition 14.

Figure 7A:
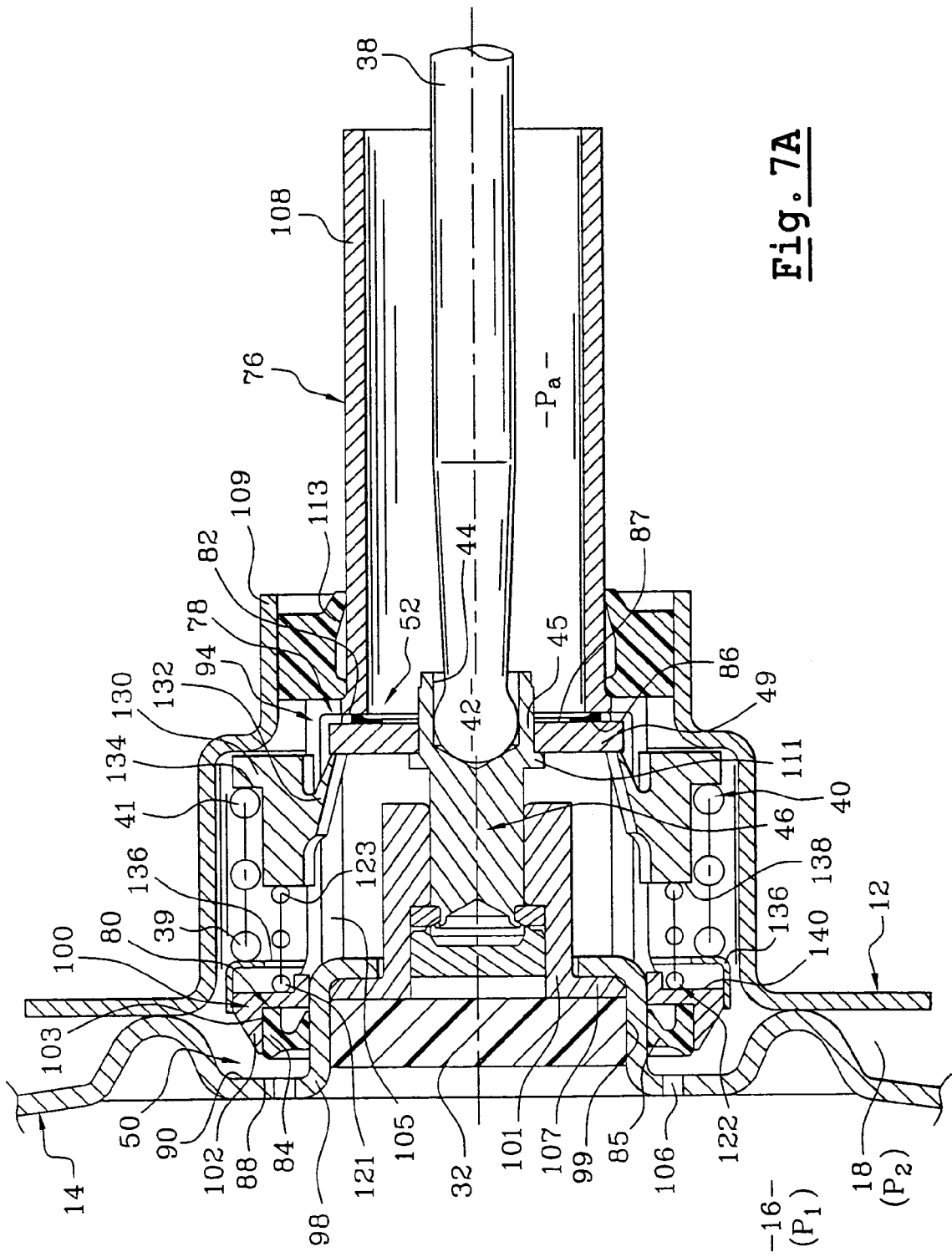
FIGS. 7a and 7b are detail views in section through servomotors associated respectively with the first and with the second embodiments of the invention, the plunger being released, the balancing valve being re-opened, and the inlet valve being re-closed.
Figure 7B:
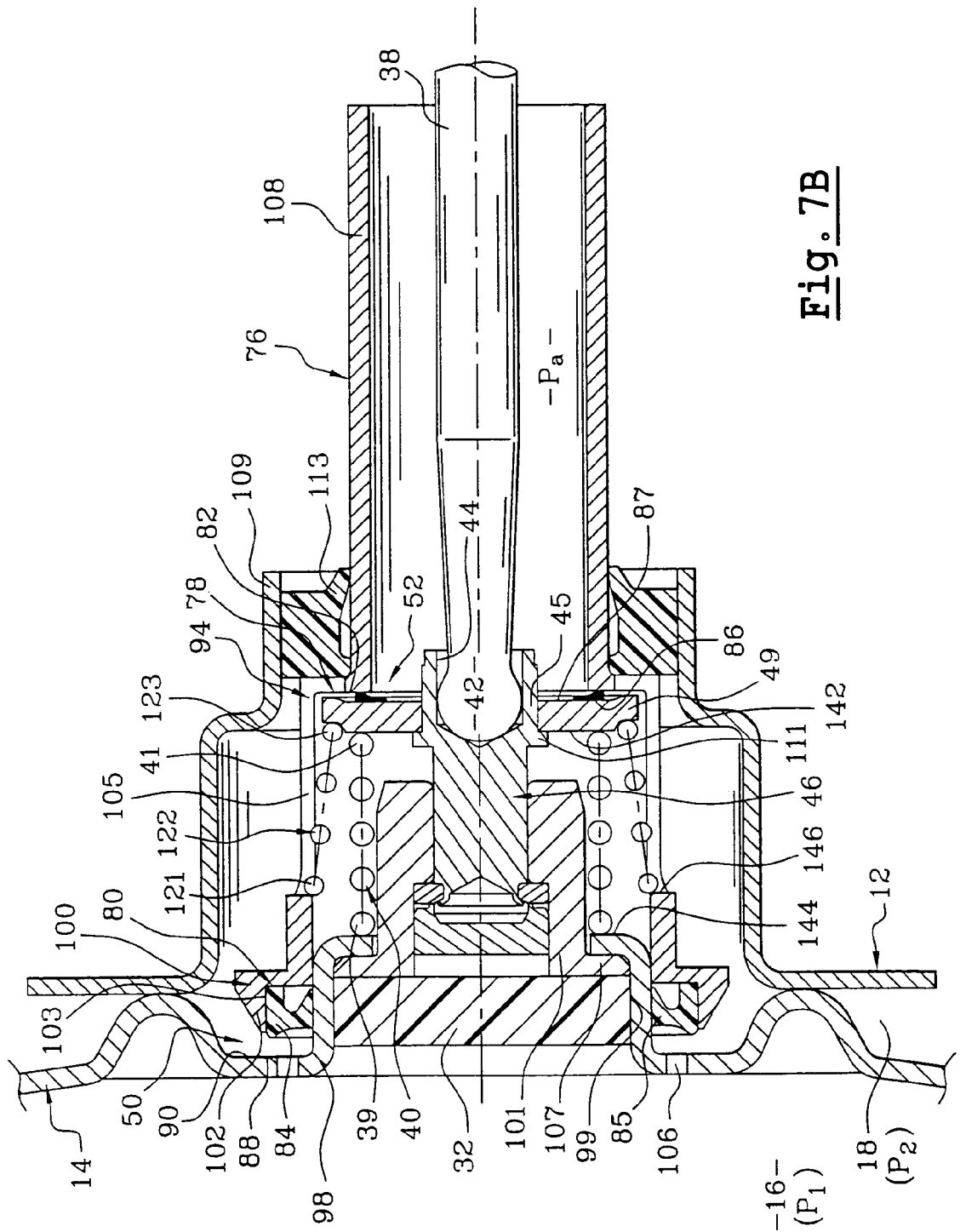

If the control rod 38 is released, as shown in FIGS. 7a and 7b, the first spring 40 relaxing causes the plunger 46 to return towards its rest position. While it is returning, the plunger 46 causes the dish-shaped washer 49 to come back into contact with the transverse face 78 interconnecting the intermediate segment 94 and the back segment 108 of the element 76, thereby closing the inlet valve 52 and then causing the tubular element 76 to return, and therefore causing the balancing valve 50 to re-open. As a result, the air at atmospheric pressure "Pa" contained in the back pressure chamber 18 flows into the front pressure chamber 14 which is subjected to the suction pressure "$P_1$".

The invention thus makes it possible to provide a servomotor that offers a short response time and that operates particularly quietly, and that, in addition, uses a stamped tubular design to a large extent, enabling it to be manufactured at lower cost.

What is claimed is:

1. A pneumatic servomotor (11) for power-assisted braking for a motor vehicle, which servomotor is:
    of the type having a rigid casing (12) inside which a moving transverse partition (14) is mounted to define in leaktight manner a front chamber (16) subjected to a first pressure ($P_1$), and a back chamber (18) subjected to a second pressure ($P_2$) varying between the first pressure ($P_1$) and a pressure ($P_a$) that is greater than the first pressure ($P_1$), which partition can drive an actuating rod (28) for actuating a master cylinder (13) associated with the servomotor (11) via a reaction disk (32), and is returned resiliently by first return means;
    of the type having a control rod (38) moving inside the casing (12) selectively as a function of an axial inlet force exerted forwards against a return force applied to the rod (38) by second return means;
    of the type in which the movements of the control rod (38) can determine opening and closing of at least one axial inlet valve (52) and which is interposed between a pressure source subjected to the pressure ($P_a$) greater than the first pressure ($P_1$) and the back chamber (18), and at least one axial balancing valve (50) and which is interposed between the front chamber (16) and the back chamber (18), for actuating the above-described moving partition (14); and
    of the type in which a plunger (46) passing through the moving partition (14) and secured to the end of the control rod (38) can drive the actuating rod (28) of the master cylinder (13) directly, via the reaction disk (32);
    said servomotor being characterized in that it includes:
    a one-piece floating tubular element (76) interposed substantially radially between the plunger (46) and the casing (12), which element is mounted to move axially, is returned resiliently towards the moving partition (14) by third return means, and has axially offset transverse faces (78, 80) that are provided with first sealing elements (82, 84) for sealing the axial inlet and balancing valves (50, 52);
    a complementary transverse second sealing element (86) for sealing the inlet axial valve (52), which element is carried by a back end of the plunger (46); and
    a complementary transverse second sealing element (88) for sealing the balancing axial valve (50), which element is provided on at least a portion of the back face (90) of the moving partition (14);
    and in that the back end (45) of the plunger (46) is provided with a dish-shaped washer (49) which includes the complementary transverse second sealing element (86) for sealing the inlet axial valve (52), and which receives in abutment ends (41, 123) of two coaxial springs (40, 122), a first spring (40) of high stiffness whose other end (39) is in abutment against the moving partition (14), and which forms the second return means associated with the control rod (38), and a second spring (122) of low stiffness whose other end (121) is in abutment against a shoulder face of the tubular element (76), and which forms the third return means associated with said tubular element (76) and which enables said tubular element to be urged to close the balancing valve (50).

2. The pneumatic servomotor (11) according to claim 1, characterized in that the floating tubular element (76) comprises:
    a front tubular segment (100) which is mounted in leaktight manner around a tubular bearing (98) on the moving partition (14), which bearing slidably receives the plunger (46) whose front end (102) that carries the first sealing element (84) of the balancing valve (50) facing the second sealing element (88) of the balancing valve (50) that is carried by the moving partition (14) is disposed radially outside at least one communication hole (106) passing through the partition (14);
    an intermediate tubular segment (94) which communicates with the back chamber (18); and
    a back tubular segment (108) which is of diameter smaller than the diameter of the intermediate segment (94), which is slidably guided in leaktight manner in a back tubular segment (109) of the casing (12) that forms an inlet duct fed by the pressure source subjected to the pressure ($P_a$) greater than the first pressure ($P_1$), and whose front transverse face (78) connecting to the intermediate segment (94) carries the second sealing element (82) of the inlet valve (52) facing the dish-shaped washer (49) of the plunger (46).

3. The servomotor (11) according to claim 2, characterized in that:
    the first sealing element (84) of the balancing valve (50) is constituted by a gasket which is received in the front segment (100) of the floating tubular element (76);
    the second sealing element (88) of the balancing valve (50) is constituted by a portion of the back face (90) of the moving partition (14);
    the first sealing element (82) of the inlet valve (52) is constituted by a front transverse face (78) of a wall interconnecting the intermediate segment (94) and the back segment (108) of the floating tubular element (76); and
    the second sealing element (86) of the inlet valve (52) is constituted by a gasket which is carried by a back face (87) of the dish-shaped washer (49) that is secured to the plunger (46).

4. The pneumatic servomotor (11) according to claim 3, characterized in that the tubular bearing (98) for guiding the plunger, which bearing is carried by the moving partition (14) extends axially from the back face (90) of the moving partition (14), and in that the moving partition (14) is provided with a plurality of holes (106) distributed angularly through the transverse partition (14) around the junction where its tubular bearing (98) meets its back face (90).

5. The servomotor (11) according to any one of claim 2 characterized in that the first spring (40) is disposed inside the second spring (122), and in that the two springs are mounted inside the tubular element (76).

6. The servomotor (11) according to claim 5, characterized in that the first spring (40) is interposed between a front face (142) of the dish-shaped washer (49) and a shoulder face (144) of the front tubular bearing (98), and in that the second spring (122) is interposed between the front face (142) of the dish-shaped washer (49) and front end transverse faces (146) of opposite longitudinal slots in the intermediate segment (94) of the tubular element (76), which slots make it possible for communication to be established with the back chamber (18).

7. The servomotor (11) according to claim 2, characterized in that the first spring (40) is disposed outside the second spring (122), and in that the two springs (40, 122) are mounted outside the tubular element (76) in abutment against the dish-shaped washer (49) via an annular holding ring (130) having at least two diametrically opposite radial arms (132) passing through associated slots (105) in the tubular element (76) to come to bear on the dish-shaped washer (49).

8. The servomotor (11) according to claim 7, characterized in that the first spring (40) is interposed between a shoulder face (134) of the annular ring (130) and a bearing cup (136) which surrounds the tubular element (76) and which is secured to the moving partition (14), and in that the second spring (122) is interposed between an end face (138) of the tubular annular ring and a shoulder transverse face (140) of the tubular element (76) that defines the front segment (100) and the intermediate segment (94) thereof.

9. The servomotor (11) according to claim 2, characterized in that the back segment (108) of the tubular element (76) is mounted in leaktight manner in the back segment (109) of the casing (12) via a lip gasket (113).

10. The servomotor (11) according to claim 2, characterized in that the plunger (46) is mounted to slide in the tubular bearing (98) of the moving partition via a slidably mounted tubular element (101) having a front collar (107) which is disposed facing the reaction disk (32) and which can be driven by a collar (111) on the plunger (46) for a force of determined magnitude to transmit the reaction force from the actuating rod (38) of the master cylinder in part to the control rod (38) of the servomotor and in part to the moving partition (14).

11. The servomotor (11) according to claim 2, said servomotor being characterized in that the moving partition (14), the floating tubular element (76), and the dish-shaped washer (49) secured to the plunger (46) are made by implementing cutting and stamping methods.

* * * * *